Figure 2:
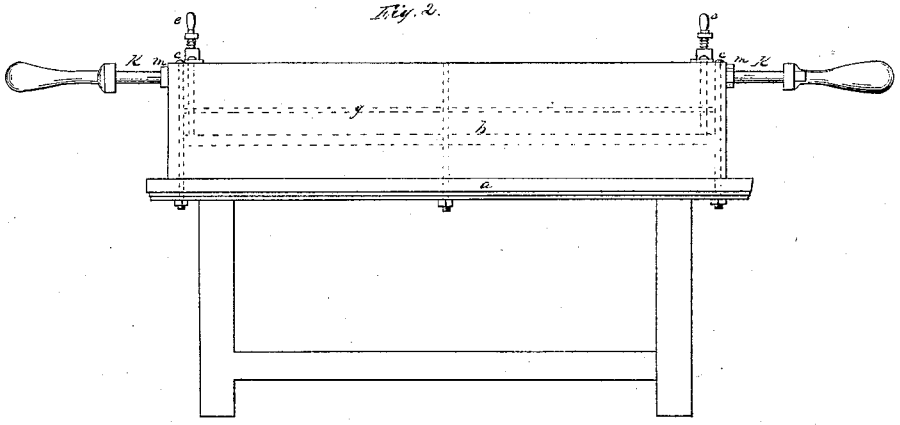
Figure 3:
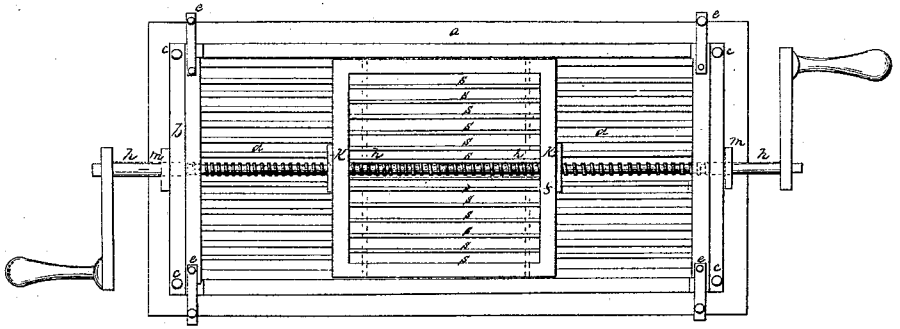
Figure 1:
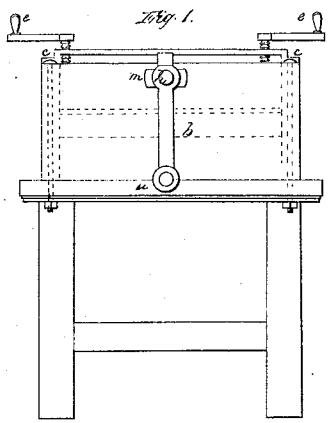
Figure 4:
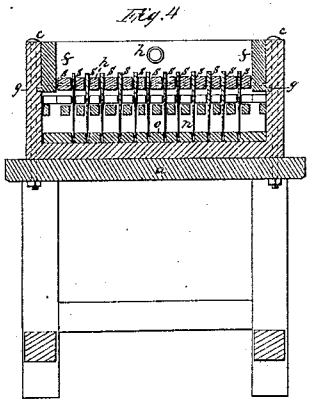

3059X

2 Sheets, Sheet 1.

J. Barron,

Cork Machine.

Patented Jan. 13, 1819.

AM. PHOTO-LITHO. CO. N.Y. (OSBORNE'S PROCESS)

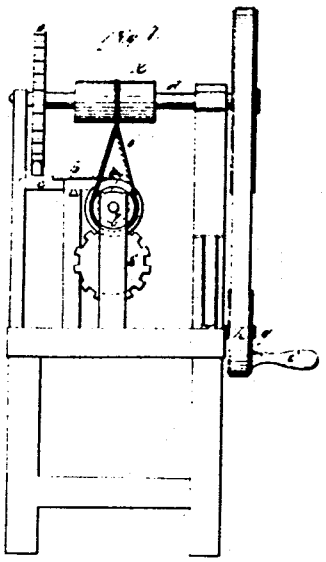
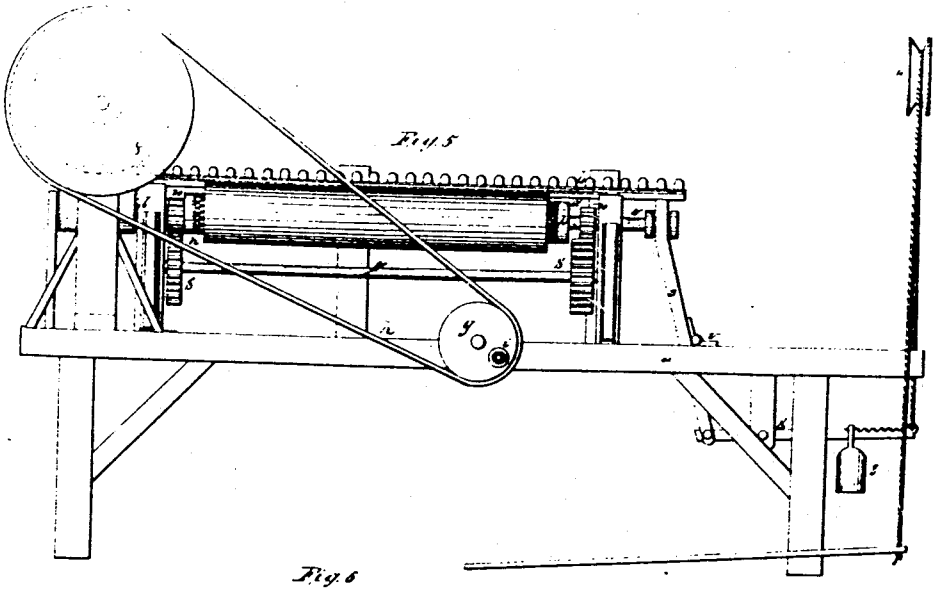
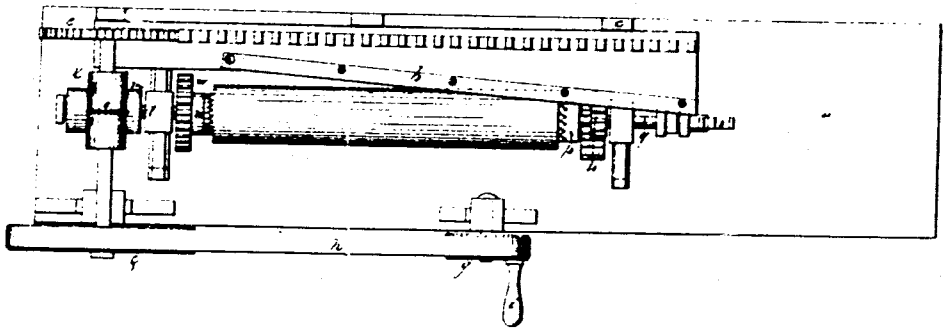

3059X
2 Sheets, Sheet 2.
J. Barron,
Cork Machine.
Patented Jan. 13, 1819.